United States Patent Office 3,011,898
Patented Dec. 5, 1961

3,011,898
METHOD FOR REDUCING MOISTURE LOSS FROM MEAT
Thomas Reid Anderson, Walnut Creek, Calif.
(4605 Gould Ave., La Canada, Calif.)
No Drawing. Filed Feb. 2, 1959, Ser. No. 790,362
1 Claim. (Cl. 99—169)

This invention relates to an improved process for reducing moisture loss from chilled meat held at a refrigeration temperature above freezing.

The applicant's U.S. Patent No. 2,948,623, issued August 9, 1960, reveals that certain film-forming fatty materials such as cetyl alcohol (hexadecanol), arachidic acid, and octadecanol form a thin film, believed to be monomolecular in thickness, on meat which significantly slows the loss of moisture from the treated meat. It appears that in time this moisture retarding film becomes less efficient, if not ineffective, when applied to chilled meat normally held in a dry state.

It has now been discovered that the effectiveness of the film toward moisture evaporation may be improved by supplying water to the treated meat in a mist, for example, through a heavy fog containing discrete particles of water or in a fine spray. Fortuitously, water introduced in this fashion to the treated meat does not permanently damage the monomolecular film. The film parts to permit the passage of the water particles therethrough and afterwards, reforms. The fatty film, so to speak, is self-healing.

The following is offered as a possible explanation of the improved process of this invention. It is now thought that the effectiveness of the hexadecanol or other fatty film depends upon the continued presence of an intermediate water layer between the monomolecular fatty film and the meat. The water of this intermediately-disposed film is believed to be initially made up of water from the originally applied aqueous dispersion. It is thought that early in the refrigeration of the treated meat that the moisture lost from the underlying water layer through the fatty film to the atmosphere is replaced by the free water of the meat; however, after a period of time the free water does not transfer to the water layer at the required rate and as a result in time the molecules of the fatty material making up the monomolecular film become randomly distributed with the result the film loses its effectiveness. The supplying of the sprayed water to the intermediately disposed water layer is thought to continue the existence of the molecules of the overlying fatty film in the proper orientation necessary to the life of an effective film.

The moisture retarding film is formed of a saturated aliphatic compound having the formula R—OH, R—COOH, where R is an aliphatic radical having at least 11 carbon atoms. Ethyl stearate may also be used. The fatty compound may be applied in the form of an aqueous dispersion, for example, an emulsion of the fatty material in water. The aqueous dispersion may be prepared by dissolving the fatty material in the water with the aid of a readily volatile solvent, such as ethyl alcohol. The suitable materials are, for the most part, waxy, crystalline flakes or needles of high melting points which cannot be satisfactorily applied to the meat, except through a dispersion, to form the necessary thin film.

The fatty alcohols and fatty acids of the foregoing formulae vary considerably in their effectiveness in the process of the invention. Among the preferred materials are the fatty acids and alcohols having from 16 to 20 carbon atoms inclusive or mixtures of those materials. The $C_{16}$–$C_{20}$ materials will generally be found to provide the greatest resistance to water evaporation. Particularly suitable compounds include octadecanol, hexadecanol (commonly known as cetyl alcohol), stearic acid (octadecanoic acid) and arachidic acid (eicosanoic acid).

Other fatty acids that may be employed include lauric, tridecoic, myristic, palmitic, margaric acids and the higher fatty acids, such as carnaubic acid and carboceric acid. The corresponding alcohols, for example, dodecanol, tridecanol, carnaubyl alcohol and ceryl alcohol may be used, but generally, the fatty acids and alcohols, below the $C_{16}$–$C_{20}$ carbon range are less effective than those of that preferred range. Dodecanol (the $C_{12}$ alcohol), for example, offers a relatively low resistance to moisture evaporation.

The aqueous emulsion may be prepared in the following manner. Equal weights of hexadecanol (or other suitable fatty material) and any of certain edible emulsifying agents are mixed together, after first heating both the emulsifying agent and the hexadecanol to a temperature in excess of 49° C. The warm mixture is then agitated with water in a mechanical shaker or a blender until the hexadecanol is placed in aqueous emulsion. In an alternative, the emulsifier may be added to the warm water and then heated fatty material introduced and the mixture shaken to form the emulsion. There are many emulsifiers suitable for use; among them are the edible partial fatty esters of polyhydric alcohols, including propylene glycol and glycerol. The suitable emulsifiers include monoglycerides, diglycerides and mixtures thereof. A preferred emulsifier contains approximately 40% monoglyceride, 40% diglyceride and 20% triglyceride and may be prepared by reacting glycerol with various animal and vegetable fats, such as lard, and cottonseed oil. An esterified mixture of lactic acid and glycerol may also be employed.

The fatty acid, alcohol or ethyl stearate may be applied in water dispersion of remarkably low concentrations. Concentrations of 30–1000 parts of the fatty material per million (p.p.m.) of water have profitably been employed. However, dispersions of greater and less concentrations may be employed, depending on the particular material used.

The sprayed water is preferably supplied intermittently to the treated meat during its refrigeration. The frequency of application is regulated to supply that amount of water needed to assure the existence of the properly oriented fatty film. A particularly suitable apparatus for developing the water laden mist is the fogger described and illustrated in U.S. Patent No. 2,850,326, Kofford. For a large scale operation, a large number of the Kofford foggers will be required and they may be conveniently provided with a time control for intermittent operation if desired.

The greatest rate of moisture loss occurs during the cooling of the recently killed carcass from its original body temperature to the temperature of the refrigerated space. The intermittent application of the mist to the cooling carcass during the early hours of refrigeration is believed to supply, to a large share, the needed water to replenish that lost by evaporation from the water layer underlying the fatty film itself. Without the water furnished by the mist, the moisture required to continue the existence of the underlying water layer (and hence the existence of the fatty film itself) would have to be completely supplied by the free water of the carcass.

*Example*

Twelve recently slaughtered rabbits were divided into four lots of three rabbits each. Lots A and B were dipped in an aqueous dispersion of hexadecanol (concentration of 60 p.p.m.). Lots C and D were dipped in water containing no film forming material. Lots A and C were hung in a first compartment of a refrigerated space maintained at 3° C. This compartment was provided with a fogger (mist forming apparatus). The other two lots (lots B and D) were hung in a second compartment (isolated from the first) of the same refrigerated space. No mist was supplied to the second compartment. Lots A and C were subjected to five minutes of mist every hour interval throughout a test period of eight hours. The results of the test are reported in the table below.

| | Shrink at 8 hours, percent |
|---|---|
| Lot A | 0.5 |
| Lot B | 1.2 |
| Lot C | 1.9 |
| Lot D | 2.4 |

The results demonstrate clearly the advantage to be had in supplying the sprayed water to the treated meat.

I claim as my invention:

In a process for minimizing moisture loss from chilled meat wherein the meat has been treated with an aqueous dispersion of a film-forming fatty material selected from the group consisting of ethyl stearate and a saturated fatty compound having the formulae of R—OH, and R—COOH, where R is an aliphatic radical having at least 11 carbon atoms to form a film having moisture retarding properties, the improvement comprising supplying water in a mist to the treated meat to improve the effectiveness of said film in retarding moisture evaporation.

References Cited in the file of this patent

UNITED STATES PATENTS

| | | |
|---|---|---|
| 1,996,392 | Torrence et al. | Apr. 2, 1935 |
| 2,214,398 | Bedford | Sept. 10, 1940 |
| 2,793,123 | Haas | May 21, 1957 |
| 2,876,109 | Hemery et al. | Mar. 3, 1959 |